(12) United States Patent
Shklover et al.

(10) Patent No.: US 7,944,615 B2
(45) Date of Patent: May 17, 2011

(54) OPTICAL SYSTEM AND METHOD FOR SHAPING A PROFILE OF A LASER BEAM

(75) Inventors: Vitaliy Shklover, Konigsbronn (DE); Holger Muenz, Aalen (DE); Michel Le Maire, Oberkochen (DE); Christian Hoess, Neu-Ulm (DE)

(73) Assignee: Carl Zeiss Laser Optics GmbH, Oberkochen (DE)

( * ) Notice: Subject to any disclaimer, the term of this patent is extended or adjusted under 35 U.S.C. 154(b) by 128 days.

(21) Appl. No.: 12/097,937

(22) PCT Filed: Dec. 20, 2006

(86) PCT No.: PCT/EP2006/012350
§ 371 (c)(1),
(2), (4) Date: Aug. 18, 2008

(87) PCT Pub. No.: WO2007/071413
PCT Pub. Date: Jun. 28, 2007

(65) Prior Publication Data
US 2009/0002833 A1 Jan. 1, 2009
US 2009/0244712 A2 Oct. 1, 2009

Related U.S. Application Data (60) Provisional application No. 60/753,829, filed on Dec. 23, 2005.

(51) Int. Cl.
*G02B 27/14* (2006.01)
(52) U.S. Cl. ....................................... 359/629
(58) Field of Classification Search .................. 359/640, 359/636, 834, 629
See application file for complete search history.

(56) References Cited

U.S. PATENT DOCUMENTS

| 4,060,308 A | 11/1977 | Barnoski et al. |
| 5,721,416 A | 2/1998 | Burghardt et al. |
| 6,028,722 A | 2/2000 | Lang |
| 2003/0137838 A1 | 7/2003 | Rizkin et al. |

FOREIGN PATENT DOCUMENTS

| DE | 100 04 999 | 9/2001 |
| EP | 0 805 368 | 11/1997 |
| EP | 1 137 130 | 9/2001 |
| EP | 1 752 812 | 2/2007 |

(Continued)

OTHER PUBLICATIONS

Handbook of Optics, Eds. W.G. Driscoll and W. Vaughan, McGraw Hill, 1978, p. 2-52.
W.J. Smith, Modern Optical Engineering, 3$^{rd}$ Ed., McGraw Hill, 2000, Ch. 6, p. 141-143.

*Primary Examiner* — Joseph Martinez
(74) *Attorney, Agent, or Firm* — Fish & Richardson P.C.

(57) ABSTRACT

An optical system for shaping an incoming beam having a divergence with an angular distribution at least in a first direction comprises at least one angle selective optical element for clipping the angular distribution in the at least first direction. The approach according to the present invention bases on using an angle-selective device operated by the principle of total internal reflection to reduce divergence of the incoming beam, in contrast to a spatially-selective device as for example a field-stop or slit. The method according to the present invention has the advantage that no physical sharp edges have to be exposed at high energy densities. Thus, thermal impact and demands on the optical elements to withstand a high power laser beam are significantly reduced.

48 Claims, 8 Drawing Sheets

FOREIGN PATENT DOCUMENTS

| | | |
|---|---|---|
| FR | 2 739 982 | 4/1997 |
| JP | 59-195347 | 11/1984 |
| JP | 02-166783 * | 6/1990 |
| JP | 02 166783 | 6/1990 |

* cited by examiner

OPTICAL SYSTEM AND METHOD FOR SHAPING A PROFILE OF A LASER BEAM

CROSS REFERENCE TO RELATED APPLICATION

This application is the National Stage of International Application No. PCT/EP2006/012350, filed Dec. 20, 2006, which claims the benefit of U.S. Provisional Application Ser. No. 60/753,829, filed Dec. 23, 2005. International Application No. PCT/EP2006/012350 is incorporated by reference herein in its entirety.

BACKGROUND OF THE INVENTION

The present invention generally relates to the field of shaping light beams, in particular laser light beams. More specifically, the present invention relates to an optical system, an optical unit and to a method for shaping an incoming beam, in particular laser beam. Such an optical system, an optical unit and a method as mentioned before are in particular useful for producing a thin laser beam for material processing, for example for a directional crystallization of amorphous silicon films. Furthermore, the optical system, optical unit and the method according to the invention can be used in a solid state ring laser, for example.

Common lasers produce light beams which, on a macroscopic scale, appear to be exactly parallel with sharp edges when seen in cross-section of the beam. However, on a microscopic scale, there is an inherent divergence in the laser beam, i.e. the beam may be considered as a bundle of rays wherein the rays have slightly different propagation directions with respect to one another. The angle distribution of the laser beam intensity, thus, exhibits a profile which has a maximum in the main direction of propagation of the laser beam (angle 0°) and has a slope to both sides of the maximum (angle≠0°). Due to the natural divergence or angular spread of the laser beam, the edges of the laser beam are not exactly sharp but somewhat smeared out.

For many optical applications, in particular laser applications like annealing of semiconductors, a very low divergence of a beam is required.

Usually a field-stop is used to limit the field of view of an optical system (see for example Handbook of Optics, OSA, Eds. W. G. Driscoll and W. Vaughan, McGraw Hill, 1978, p. 2-52, W. J. Smith, Modern Optical Engineering, 3rd Ed., McGraw Hill, 2000, Ch. 6, p. 141-143). This approach is based on a spatial filtering, i.e. a diaphragm or a slit is used to reduce the size of the object which the system will image.

Specifically, U.S. Pat. No. 5,721,416 discloses an optical device for generating a sharp illuminating line on an illuminating plane from a high-power laser beam. This known device is based on spatial filtering. The sharp illuminating line includes long and short axes. The optical device comprises an anamorphic setup of imaging and homogenizing optical systems for the separate imaging and homogenizing of the laser beam in the direction of the long and short axes. For imaging and homogenizing the laser beam in the direction of the short axes, a slit is illuminated homogenously and the slit is imaged on the illumination plane by reducing optics. Thus, this known optical system also uses a slit for shaping the laser beam.

Despite the fact that an optical system using such a field-stop works quite well, the use of a slit or field-stop implies several drawbacks. One of the drawbacks arises when such a system is used in applications requiring a high energy density of the beam. Due to the high energy density of the beam, the body of the field-stop heats up to very high temperatures leading to deformations of the field-stop or slit. The result is that the beam shaping becomes inaccurate. Further, in order to produce very sharp edges of the light beam, the field-stop or slit must be manufactured with high precision machined sharp edges in order to be able to shape the incoming beam as desired.

U.S. Pat. No. 4,060,308 discloses an angle selective coupler for coupling optical energy into and/or out of optical fibers. The coupler consists of a section of the optical fiber modified in such a way as to allow optical excitation of a plurality of higher order modes of optical transmission, each mode being defined by a given angle of propagation relative to the fiber axis. In one embodiment the coupling section comprises a single strand of glass fiber waveguide which is tapered along its length. The existence of the tapered section allows coupling of radiation from an external source into a given propagation angle in the fiber. This document does not deal with the technical problem of producing a laser beam having sharp edges.

Due to the afore-mentioned drawbacks of the known optical systems and methods, there is still a need for an optical system and a method for shaping an incoming beam which does not rely on a spatial filtering.

SUMMARY OF THE INVENTION

An object of the present invention is therefore to provide an optical system for shaping an incoming beam having a divergence with an angular distribution, wherein the physical effect the optical system uses deviates from that known from the prior art.

It is a further object of the present invention to provide an optical system for shaping an incoming beam having a divergence with an angular distribution which is capable of shaping the incoming beam with high power and/or high energy densities.

It is another object of the present invention to provide an optical system for shaping an incoming beam having a divergence, wherein the thermal impact is reduced significantly as compared to solutions known from the prior art.

It is a further object of the present invention to provide an optical system being capable of reducing an illumination line with a width and a length on a surface which has sharp edges.

It is still another object of the present invention to provide an optical system being capable of producing an illumination line with a width and a length on a surface which has a high aspect ratio with a length exceeding the width by several hundreds fold and has sharp edges.

It is still a further object of the present invention to provide an optical system for producing a thin laser beam for material processing, in particular for use in a laser annealing apparatus for annealing a substrate.

It is a further object of the present invention to provide an optical system for reducing an thin laser beam for material processing, in particular for use in a laser annealing and scanning apparatus for annealing a substrate, wherein the laser beam is scanned with respect to the surface of the substrate.

It is a further object of the present invention to provide a method for shaping an incoming beam having a divergence with an angular distribution, wherein the physical effect used deviates from that known from the prior art.

It is a further object of the present invention to provide a method for shaping an incoming beam having a divergence with an angular distribution and having high power and/or high energy densities.

It is a further object of the present invention to provide a method for shaping an incoming beam having a divergence, wherein the thermal impact is reduced significantly as compared to solutions known from the prior art.

It is a further object of the present invention to provide a method being capable of producing an illumination line with a width and length on a surface, wherein the illumination line has sharp edges.

It is still another object of the present invention to provide a method being capable of producing an illumination line with a width and a length on a surface, wherein the illumination line has a high aspect ratio with a length exceeding the width by several hundreds fold and wherein the illumination line has sharp edges.

According to an aspect of the invention, an optical system for shaping an incoming beam having a divergence with an angular distribution at least in a first direction is provided, wherein the optical system comprises at least one angle selective optical element for clipping the angular distribution in the at least first direction.

According to another aspect of the invention, a beam shaping optical unit for shaping an intensity profile of an incident beam and forming an intensity profile of an exit beam is provided, wherein the incident beam has at least at one side a first intensity gradient due to a divergence of the incident beam at least in a first dimension, the beam shaping optical unit shaping the exit beam such that the exit beam has a second intensity gradient at the at least one side, wherein the second gradient is larger than the first gradient, the beam shaping optical unit forming the intensity profile of the exit beam by at least one total internal reflection.

According to still another aspect of the invention, a method for shaping an incoming beam having a divergence with an angular distribution in a first direction is provided, comprising clipping the angular distribution in the first direction.

The approach according to the present invention bases on using an angle-selective device to reduce divergence of the incoming beam, in contrast to a spatially-selective device as for example a field-stop or slit. The method according to the present invention has the advantage that no physical sharp edges have to be exposed at high energy densities. Thus, demands on the optical elements to withstand a high power laser beam are significantly reduced.

In preferred embodiments, the system and the method of the present invention are based on the angle-selective properties of total internal reflection (TIR), i.e. the beam propagates in a material with a higher refraction index to an interface with the material having a lower index and will be reflected at the interface, if the incidence angle exceeds a certain critical angle called the total internal reflection angle. Those rays of the beam which propagate at an angle of $\neq 0°$ with respect to the main direction of propagation of the beam will be at least partially transmitted through that interface, and are, thus, clipped or, in other words, cut off.

In the case where it is intended to generate a beam with trapezoidal or rectangular cross-section, the present invention allows to reduce divergence in e.g. one certain direction (substitution of a slit formed e.g. by a field-stop as for example known from U.S. Pat. No. 5,721,416) and does not affect the divergence in, for example, the orthogonal direction. The combination of two such devices for two (for example orthogonal) dimensions provides independent adjustment of divergence for both (i.e. orthogonal) cross-sectional dimensions of the beam.

Further features and advantages will become apparent from the following description and the accompanying drawings.

BRIEF DESCRIPTION OF THE DRAWINGS

Exemplary embodiments are shown in the drawings and will be explained hereafter in more detail with reference to the drawings. In the drawings.

DETAILED DESCRIPTION OF PREFERRED EMBODIMENTS

Figure 1:
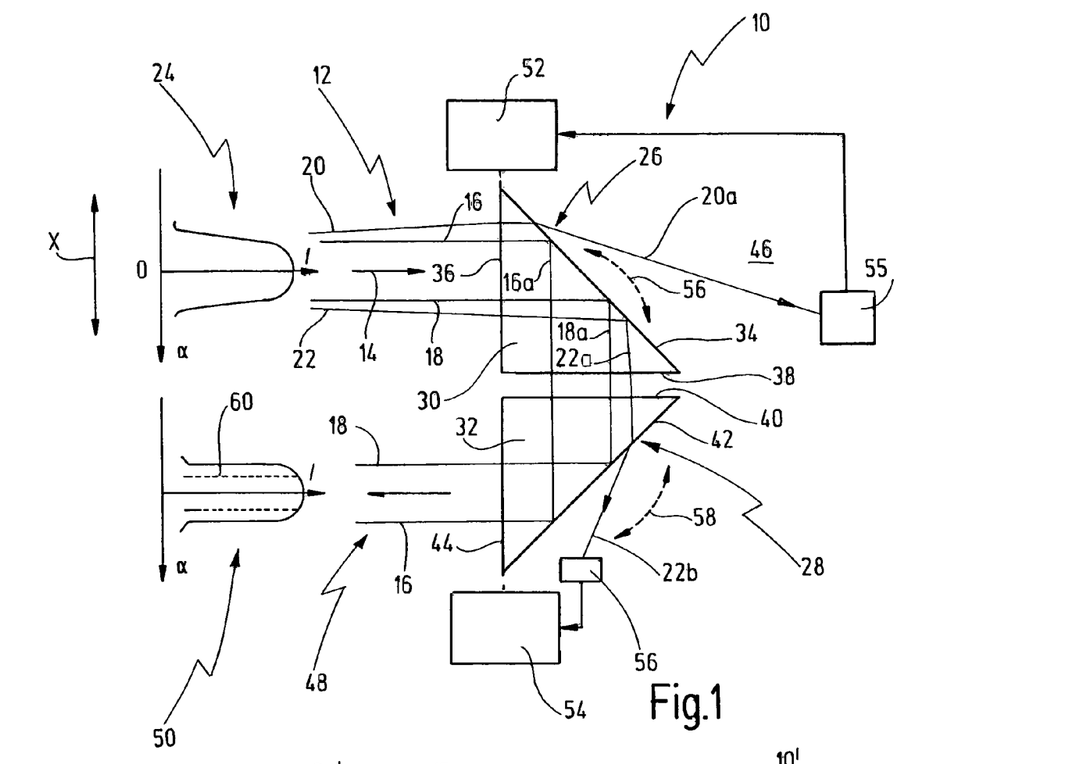
FIG. 1 shows an optical system for shaping an incoming beam having a divergence according to a preferred general embodiment, illustrating the principles of the present invention.

FIG. 1 generally shows an optical system or optical unit 10 for shaping an incoming beam 12.

The principles of the present invention explained with respect to the embodiment of FIG. 1 are also valid for all other embodiments described herein.

The incoming beam 12 propagates in direction of an arrow 14. The beam 12 is depicted in FIG. 1 by two lines 16 and 18 extending parallel to the main direction of propagation (arrow 14) of the incoming beam 12, and by two margin lines 20 and 22 which are not parallel to the direction of propagation (arrow 14) but slightly diverge with respect thereto. Thus, the incoming beam 12 has a divergence in a first direction x which lies in the plane of the drawing of FIG. 1. Due to the divergence, the incoming beam 12 exhibits an angular intensity distribution as shown by a graph 24 where the intensity I is plotted versus the angle $\alpha$ which is assumed to be zero in the direction of propagation (arrow 14). As graph 24 shows, the maximum intensity is at angle $\alpha=0$, while the intensity has a slope to angles $\alpha \neq 0$, i.e. has a finite gradient. As a result, the incoming beam 12 does not have sharp edges in the direction x, but the edges are somewhat smeared out.

Line 20 forms an edge of the incoming beam 12 on one side, and line 22 forms the opposite edge on the opposite side of the incoming beam 12 in the first direction x. The direction x may be, for example, the width dimension of the incoming beam 12.

What is desired is that the incoming beam 12 be shaped such that the parallel lines 16 and 18 form the two sharp edges of the beam 12 in the first direction or dimension x. In order to shape the incoming beam 12 in this way, the optical system or unit 10 is provided.

The optical system 10 comprises at least one angle-selective optical element, with the embodiment showing two, angle-selective optical elements 26 and 28. The angle-selective optical elements 26 and 28 are angle-selectively reflecting elements, in particular prisms 30 and 32. Prism 30 comprises three surfaces 34, 36 and 38, wherein the surfaces 34 and 36 on the one hand and the surfaces 34 and 38 on the other hand intersect at an angle of 45°. Thus, prism 30 is a right angle prism, wherein surfaces 36 and 38 form the katheti and surface 34 forms the hypotenuse.

It is to be understood that prisms 30 and/or 32 can be replaced by any other suited optical element, for example a rod, a plate, a cuboid, a polygon shaped optical element, a trapezoid, a parallelogram, etc.

Surface 36 is the entrance surface of the prism 30, and surface 38 forms the exit surface.

Likewise, the prism 32 comprises three surfaces 40, 42 and 44, wherein the surfaces 40 and 42 on the one hand and 42 and 44 on the other hand intersect at an angle of 45°. Surface 40 of the prism 32 forms an entrance surface, and surface 44 an exit surface of the prism 32.

The prisms 30 and 32 are, for example, made of a medium having a refractive index which is larger than 1. The prisms 30 and 32 may be made from any suited material, in particular silica, calcium fluoride and the like, which is transmissive with respect to the wavelength of the beam 12.

In particular, the surfaces 34 and 42 of the prisms 30 and 32 form interfaces to the ambient environment 46, which is, for example, air, which has a refractive index which is lower than the refractive index of the medium of the prisms 30 and 32.

The incoming beam 12, which preferably has been collimated before, first enters the prism 30 through the entrance surface 36, preferable at right angles in order to avoid a beam deflection. The prism 30 is positioned and designed such that the incoming beam 12 is incident on the surface 34 at an incidence angle which is close to the angle of total internal reflection (TIR) at the surface 34. Those rays of the incoming beam 12 which are incident on the surface 34 at an angle which is larger than the TIR angle will be reflected at the surface 34 as it is the case for the rays illustrated by the lines 16 and 18 and 22 of the incoming beam 12. The reflected rays are labeled with 16a, 18a, 22a.

Those rays of the incoming beam 12 which are incident on the surface 34 at an angle which is lower than the TIR angle, will be (at least partially) transmitted through the surface 34. This is the case for the ray illustrated by the line 20 of the incoming beam 12, i.e. the divergent rays on one side of the incoming beam 12 will be clipped or cut off by the first prism 30. The transmitted ray is labeled with 20a.

It is to be noted that the rays of the incoming beam 12 illustrated by the divergent line 22, are also incident on the surface 34 at an angle larger than the TIR angle, and, thus, will be reflected at the surface 34. Thus, the prism 30 clips the angular distribution of the incoming beam 12 in the direction or dimension x only on one side (line 20), while the other side (line 22) is not cut off by the prism 30.

The second prism 32 is effective in shaping the other side of the angular distribution in the first direction or dimension x. As can be seen in FIG. 1, after having been reflected at the surface 34, the ray according to line 22, 22a will be incident on the surface 42 of the prism 32 at an angle which is lower than the TIR angle at the surface 42 and, thus, is (at least partially) transmitted through surface 42 (illustrated by line 22b). Thus, the divergent part of the other edge of the incoming beam 12 is cut off by the prism 32. The result is an exit beam 48 where the angular distribution is clipped on both sides in the first direction or dimension x. A graph 50 shows the angular intensity distribution of the exit beam 48. As can be seen, the gradient of the angular distribution is larger than the gradient of the angular distribution of the incoming beam 12.

It is to be understood that surface 34 and/or 42 can have a plane shape, but also a sphere, a cylinder, an asphere or other shapes.

The incidence angle of the incoming beam 20 on the surface 34 and on the surface 42 can be adjusted by actuators 52 and 54 for rotational control of the prisms 30 and 32 according to double arrows 56 and 58. The control of the rotational angle of the prisms 30 and 32 can be used to determine how much of the angular distribution or spectrum of the beam 12 is cut off by the prisms 30 and 32. Rotational control of both prisms 30 and 32 allows to reduce the divergence of the incoming beam 12 to any desired value. An angular intensity distribution according to a dashed line 60 in graph 50 exhibiting a divergence profile of the exit beam 48 with still a smaller divergence is obtained if both prisms 30 and 32 are rotated such that the incidence angles on the surfaces 34 and 42 are slightly higher.

The transmitted, i.e. the clipped portions (lines 20a, 22b) can be caught by detectors 55, 56 for a feed-back control of actuators 52 and 54 in order to adjust the rotational position of prisms 30 and/or 32 in order to obtain the desired beam shape, wherein the control of the beam shape can be made for both sides of the beam 12 independent from one another, if desired.

This kind of rotational control can be applied to any of the preferred embodiments presented below just as well, and to those skilled in the art it will be obvious that there are other methods of controlling the incidence angle on the TIR surfaces 34 and 42 (for example changing the orientation of a mirror which reflects the beam into the prism 30 or 32) which can be combined with any of the embodiments described here.

Further the entrance surfaces 36 and 40 as well as the exit surfaces 38 and 44 of the prisms 30 and 32, which preferably are orthogonal to the respective beam position, may be coated with an anti-reflective (AR) coating to reduce optical losses in the system 10.

To increase the gradient of the angular distribution, the angle filtering using TIR can be enhanced by coating the surfaces 34 and 42 with an appropriate high reflective (HR) coating.

Figure 2:
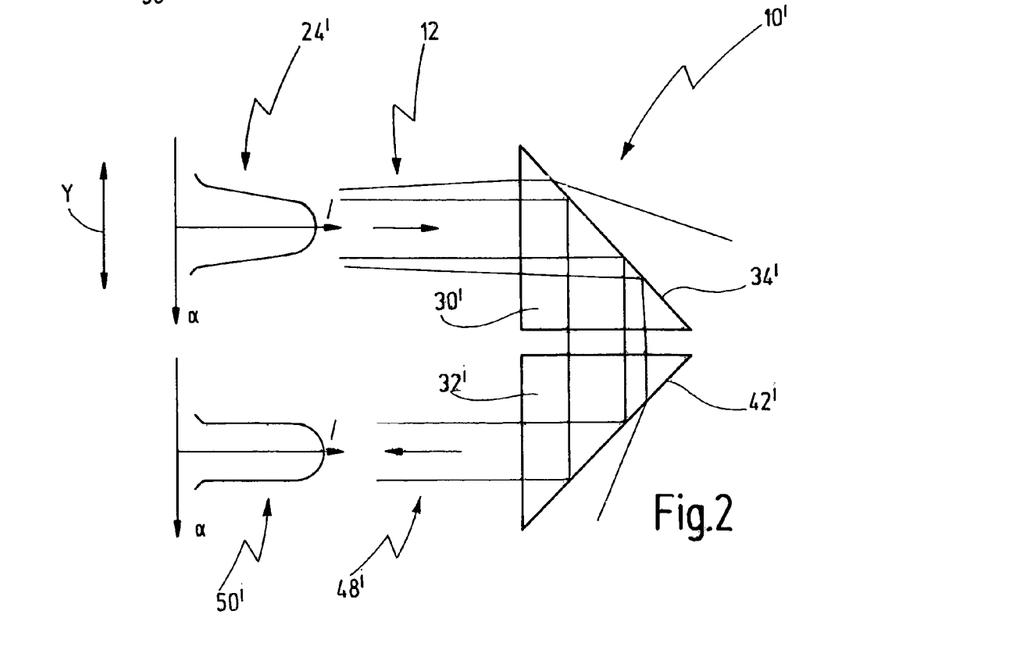
FIG. 2 shows another embodiment of an optical system for shaping an incoming beam.

While FIG. 1 has bees described with respect to the clipping or cutting off of an angular distribution in a first direction or dimension x, FIG. 2 shows an optical system 10' for shaping the incoming beam 12 which has a divergence with an angular distribution in a second direction or dimension y, which is orthogonal to the first direction or dimension x. The second dimension y defines a length of the incoming beam 12, which may be hundred times larger than the width of the incoming beam 12 in the dimension x. For example, the incoming beam 12 may have an extension in the direction x which is less than about 15 μm, while the incoming beam 12 has an extension in the second direction, which is at least about 300 mm.

The optical system 10' again comprises two prisms 30' and 32' which are arranged such that the TIR surfaces 34' and 42' are orthogonal to the TIR surfaces 34 and 42 of the prisms 30 and 32. The clipping or cutting off effect of the prisms 30' and 32' is based on the same principle as the clipping or cutting off effect of the prisms 30 and 32 so that reference is made to the description above.

The optical system 10' may be arranged in series with the optical system 10, so that the exit beam 48 forms the incoming beam 12 with respect to the optical system 10'.

The graph 24' shows the angular intensity distribution of the incoming beam 12 in the second direction or dimension y, and the graph 50' shows the clipped angular intensity distribution of the exit beam 48' exhibiting sharp edges of the exit beam 48' on both sides in the direction y.

After having passed the optical system 10 and the optical system 10', the beam 12 has been shaped in both directions or dimensions x and y, in each case on both sides thereof.

Figure 3:
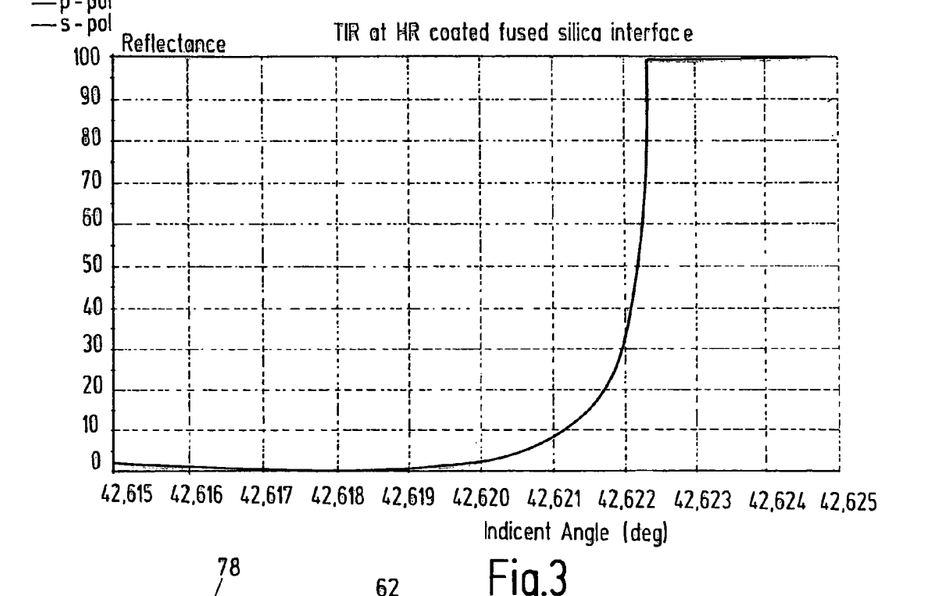
FIG. 3 shows a graph illustrating the effect of a high refractive coating on a total internal reflection (TIR) surface.

FIG. 3 shows the effect of an HR coating on a TIR surface like the surfaces 34 and 42 or 34' and 42'. FIG. 3 shows a graph where the reflectance (in %) is plotted versus the incidence angle (in degrees) for an HR coated fused silica interface. The reflectance is 100% from a critical angle of TIR of about 42.6224° and drops to 30% in a range of about 0.0005°. Thus, an appropriate HR coating enhances the angle filtering effect of TIR.

Figure 4:
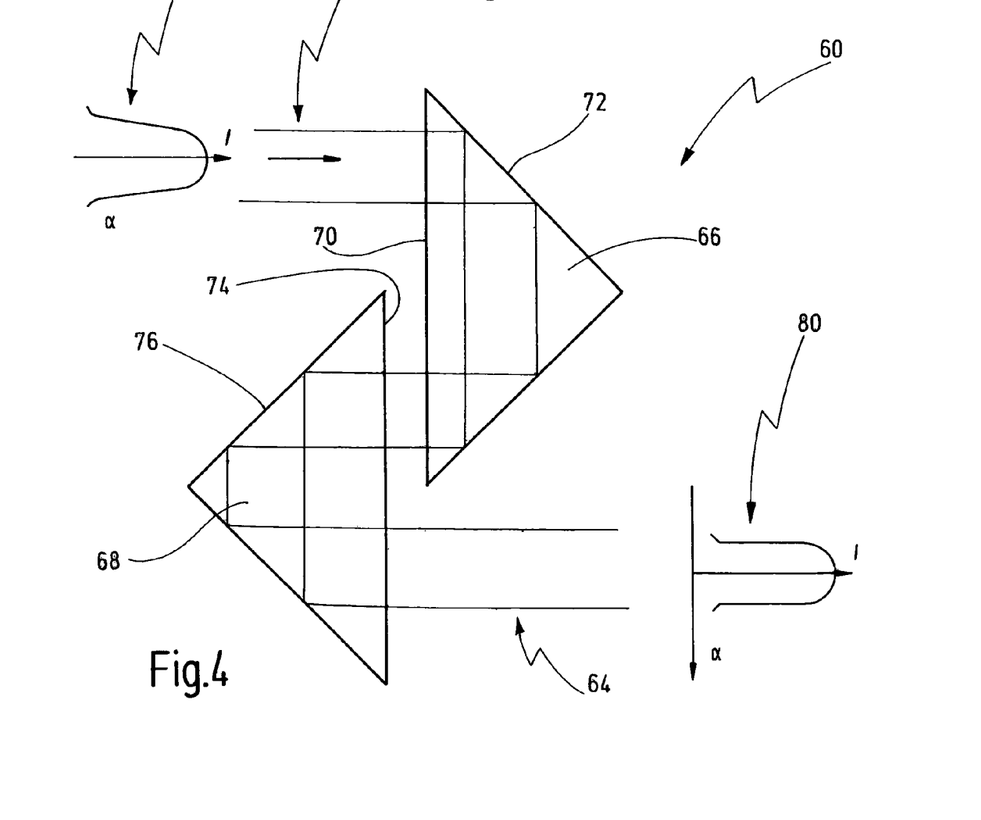
FIG. 4 shows another preferred embodiment of an optical system for shaping an incoming beam.

FIG. 4 shows another embodiment of an optical system 60 for shaping the intensity profile of an incoming beam 62 which is based on the same principle of angle filtering like the embodiments in FIGS. 1 and 2. The difference between the optical system 60 and the optical systems 10 and 10' is that the direction of propagation of an exit beam 64 is parallel to the direction of propagation of the incoming beam 62. This is achieved by the fact that two right-angled prisms 66 and 68 are arranged with respect to the incoming beam 62 such that a hypotenuse 70 of the prism 66 forms the entrance surface, and a first kathetus 72 forms the TIR surface of the prism 66 for clipping the angular intensity distribution on one side of the incoming beam 62, and a hypotenuse 74 forms the entrance surface of the second prism 68 and a first kathetus 76 forms the TIR surface of the prism 68. The hypotenuses 70 and 74 of the prisms 66 and 68 not only form the respective entrance surface of the prisms 66 and 68, but also the respective exit surface of the prisms 66 and 68, thus resulting in the exit beam 64 having a direction of propagation which is parallel to the direction of propagation of the incoming beam 62.

A graph 78 shows the angular intensity distribution of the incoming beam 62, and a graph 80 shows the angular intensity distribution of the exit beam 64 which exhibits sharp edges on both sides in one dimension, which is the plane of drawing in FIG. 4.

Figure 5:
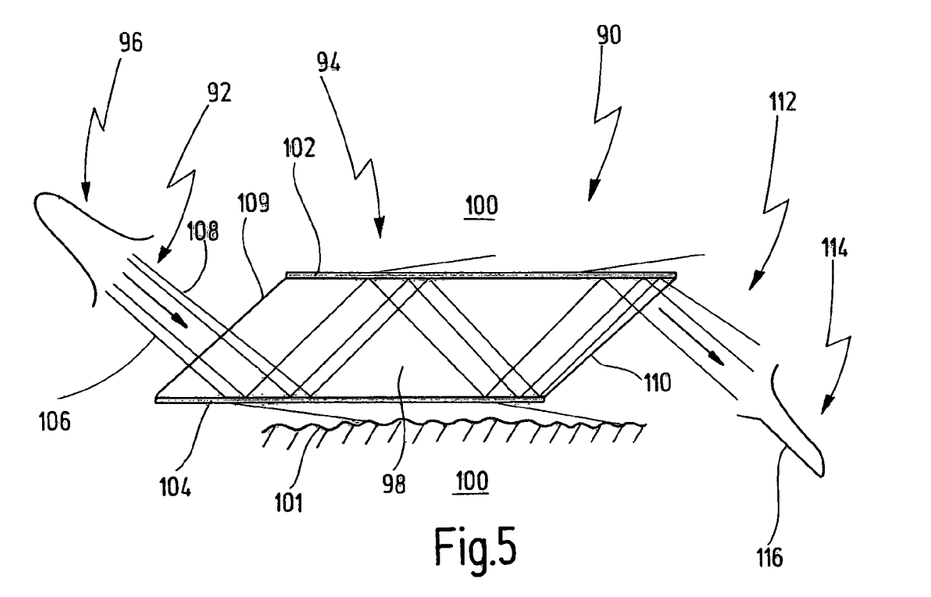
FIG. 5 shows another preferred embodiment of an optical system for shaping an incoming beam.

FIG. 5 shows another embodiment of an optical system 90 for shaping an incoming beam 92 which also uses an angle-selective optical element, in particular angle-selectively reflecting element 94 for clipping an angular distribution 96 of the incoming beam 92 by using TIR. The optical element 94 is a highly planar parallel plate or rod 98 comprising an optical medium having a refractive index which is higher than a refractive index of an environmental medium 100, which, for example, is air. The medium of the optical element 98 may again comprise any suited material which is transmissive to the wavelength of the incoming beam 92.

The optical element 98 has two TIR surfaces 102 and 104 which may be coated with an HR coating. The optical element 98 clips the angular distribution 96 of the incoming beam 92 on one side, namely on the side illustrated by a line 106, while the angular distribution is not clipped on the other side which is illustrated by a line 108. Each time the incoming beam 92 strikes the surface 102 or the surface 104, those rays of the incoming beam 92 which have a divergence such that they are incident on the surfaces 104 and 102 at an angle lower than the critical angle of TIR will at least partially be transmitted through the surfaces 102 and 104 and can be absorbed by a beam dump, for example a water-cooled beam dump 101. An exit beam 112 emerges from an exit surface 110 of the optical element 98 having an angular intensity distribution 114 exhibiting a sharp edge on one side of the exit beam 112.

This embodiment uses multiple TIR for shaping the beam 92 (here four fold TIR).

Figure 6:
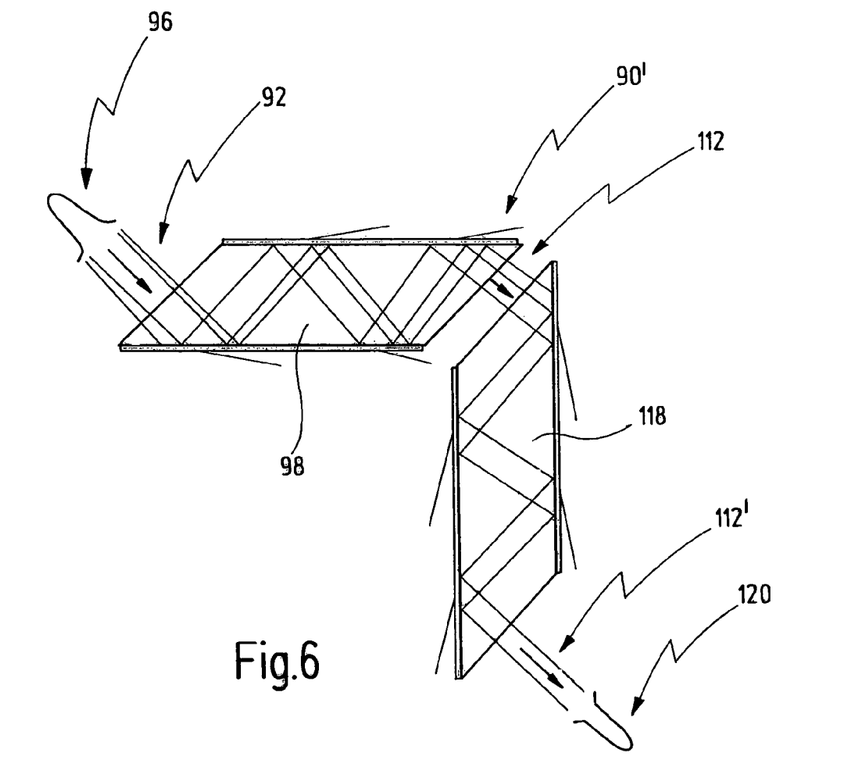
FIG. 6 shows another preferred embodiment of an optical system for shaping an incoming beam.

FIG. 6 shows a modification of the optical system 90 in form of an optical system 90' which, in addition to the optical element 98 comprises a further optical element 118 in form of a planoparallel plate arranged in series with the optical element 98 and rotated by 90° with respect to the latter. While the optical element 98 clips the angular distribution 96 on one side of the incoming beam 92, the optical element 118 clips the angular distribution on the other, i.e. opposite side of the beam 92, or more exactly of the exit beam 112 so that an intensity distribution 120 is produced as shown in FIG. 6 where the final exit beam 112' has sharp edges on both sides thereof.

It is to be understood that the optical element 98 and/or the optical element 118 shown in FIGS. 5 and 6 can be provided with a rotational control similar to the embodiments shown in FIGS. 1 and 2 for adjusting the profile shape of the exit beam 112 and/or 112'.

Further, surfaces 102, 104 as well as the corresponding TIR surfaces of the optical elements 118 may be coated with an HR coating, and the entrance and exit surfaces 109 and 110 of the optical element 98 as well as the corresponding entrance and exit surfaces of the optical element 118 can be coated with an HR coating.

Figure 7:
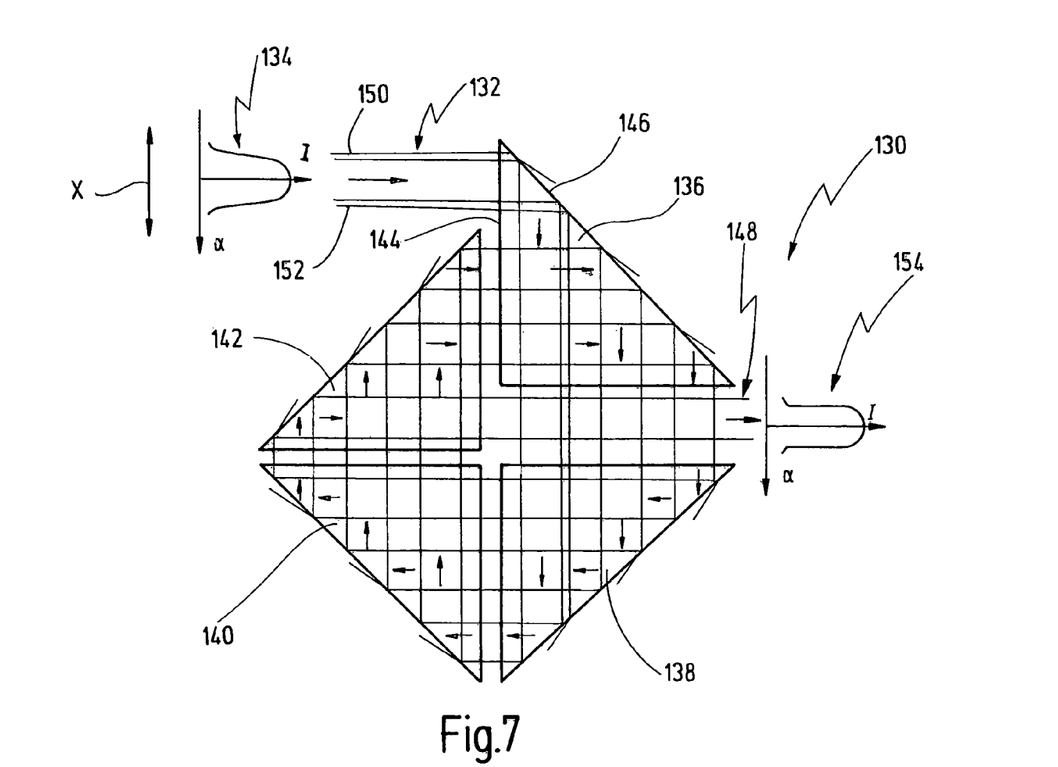
FIG. 7 shows another preferred embodiment of an optical system for shaping an incoming beam.

FIG. 7 shows another embodiment of an optical system 130 for shaping an incoming beam 132 having a divergence with an angular distribution at least in a first direction. A graph 134 shows the angular intensity distribution of the incoming beam 132.

The optical system 130 comprises four angle-selective optical elements, in particular angle-selectively reflecting elements, in the present case four right-angled prisms 136, 138, 140, 142.

Prisms 136 and 138 are arranged in similar fashion like the prisms 30 and 32 of the optical system 10 in FIG. 1. The hypotenuses of the prisms 136 and 138 are arranged as TIR surfaces.

In the direction of propagation of the incoming beam 132, the prism 140 is arranged behind the prism 138, and the prism 140 is followed by the prism 142 from which the beam 132 is again directed into the prism 136.

The incoming beam 132 first enters an entrance surface 144 of the prism 136 in a marginal region of the surface 144. Departing from the TIR surface 146 of the prism 136, the beam 132 follows a path through the four prisms 136 through 142 according to the arrows depicted in FIG. 7. As shown in FIG. 7, the beam 132 passes each prism three times, until an exit beam 148 emerges from prism 142 in a direction parallel to the direction of propagation of incoming beam 132. In order to couple out the exit beam 148 from the optical system 130, the prisms 136 and 138 are spaced apart from each other by a distance sufficient for the exit beam 148 to pass between both prisms 136 and 138.

The optical system 130 uses multiple TIR for enhancing the effects of clipping or cutting off the angular distribution in a direction or dimension x. In particular, the optical system 130 clips or cuts off the angular distribution in the direction or dimension x on both sides 150 and 152, as shown by a graph 154.

It is to be understood that the TIR surfaces of the prisms 136 through 142 may be coated with an HR coating, while the entrance and exit surfaces of the prisms 136 through 142 may be coated with an anti-reflective coating in order to avoid losses in the optical system 130.

Figure 8:
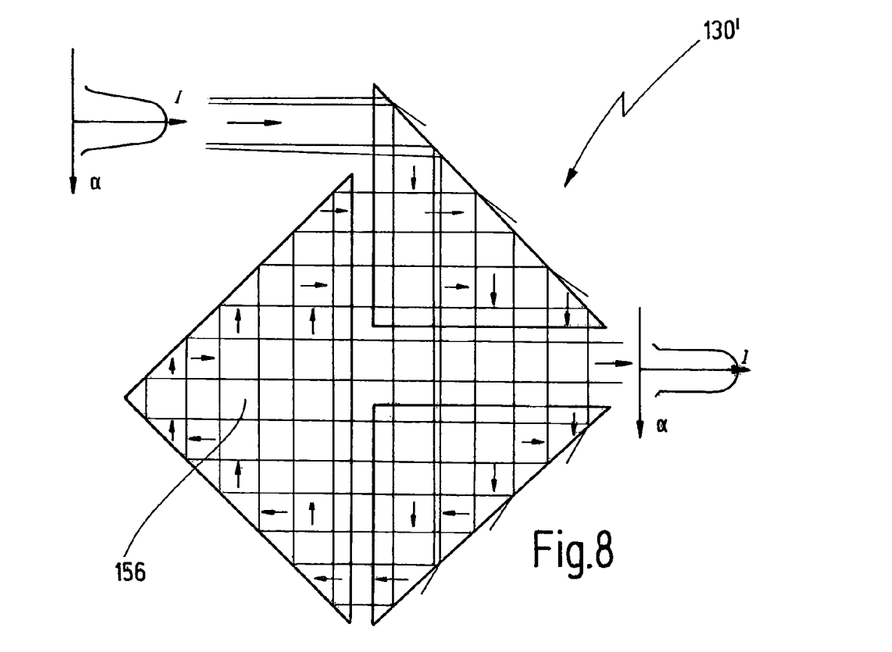
FIG. 8 shows another preferred embodiment of an optical system for shaping an incoming beam.

FIG. 8 shows an optical system 130' which is slightly modified with respect to the optical system 130 in that the two prisms 140 and 142 are replaced by one retro-reflector prism 156 thus reducing the number of entrance and exit surfaces and, thus, reducing losses in the optical system 130'.

Figure 9:
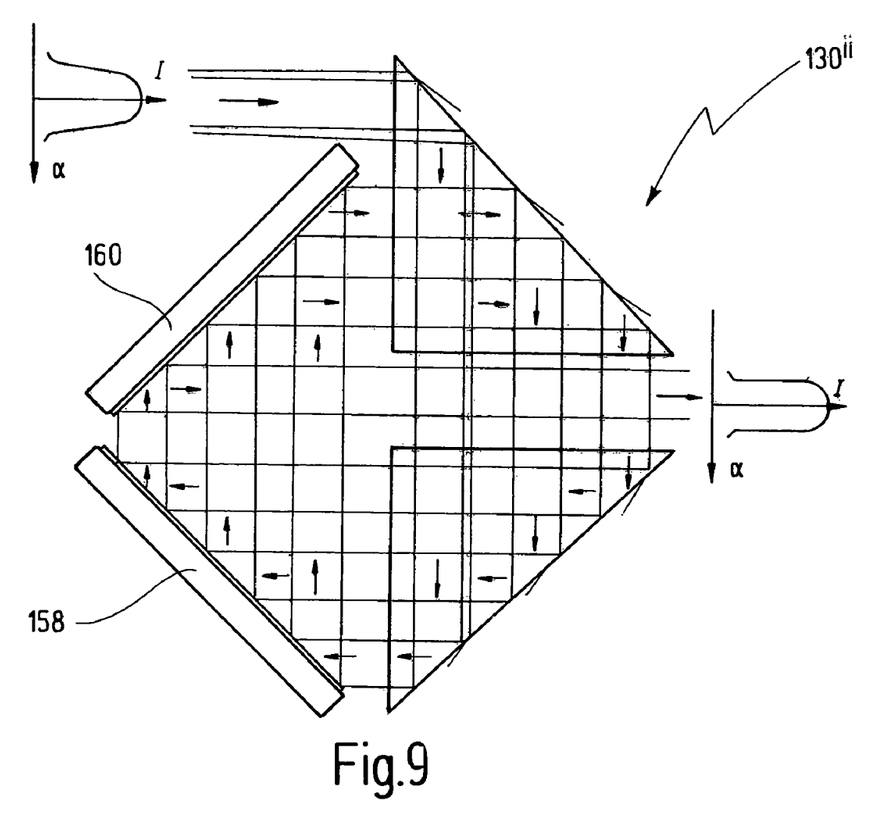
FIG. 9 shows another preferred embodiment of an optical system for shaping an incoming beam.

FIG. 9 shows another embodiment of an optical system 130" which is a further modification of the optical system 130 or 130' in FIG. 7 or 8. In case of the optical system 130", the two prisms 140 and 142 of the optical system 130 or the retro-reflective prism 156 of the optical system 130' have been replaced by two mirrors 158, 160. It is to be noted that the mirrors 158 and 160 do not contribute to the beam shaping as such, because there is no angular filtering by the mirrors 158 and 160. The mirrors 158 and 160 only work as folding mirrors.

Figure 10:
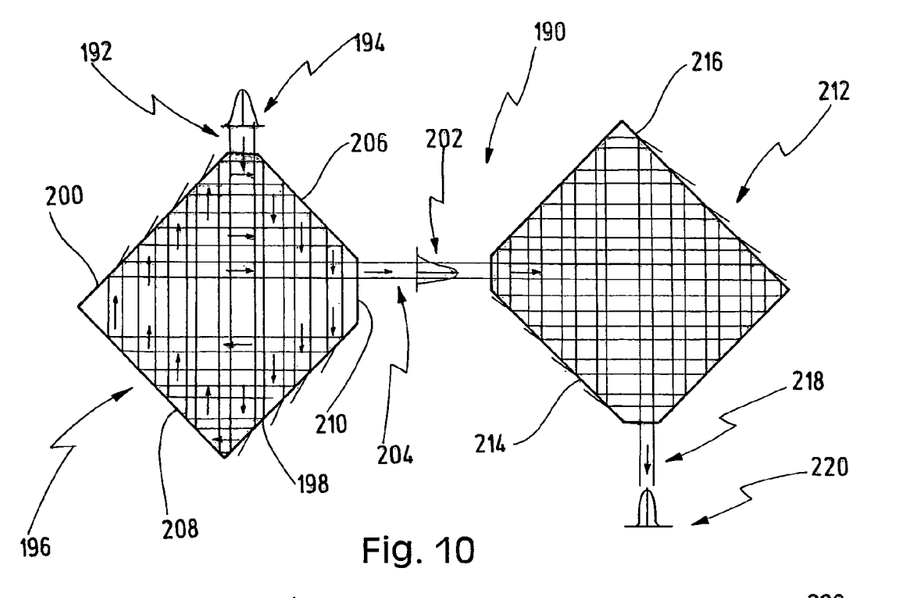
FIG. 10 shows another preferred embodiment of an optical system for shaping an incoming beam.

FIG. 10 shows another embodiment of an optical system or unit 190 for shaping an incoming beam 192.

The optical system 190 again uses TIR for angular filtering an angular distribution 194 of the incoming beam 192 in one direction, e.g. the x-direction or the y-direction of the beam 192.

The optical system 190 comprises a first optical element 196, having two parallel TIR surfaces 198 and 200 which clip the angular distribution 194 of the incoming beam 192 on one side as shown by a graph 202 showing the angular distribution of an exit beam 204.

The optical element 196 is formed as a rectangular plate having two further surfaces 206 and 208 parallel to each other for folding the beam 192 passing through the optical element 196. The beam path of the beam 192 in the optical element 196 is illustrated by small arrows. The exit beam 204 emerges through an exit surface 210 of the optical element 196. The optical element 196 is effective in clipping the angular distribution of the incoming beam 192 on one side only. In order to also clip the angular distribution on the opposite side, a second optical element 212 is provided having two TIR surfaces 214 and 216 for clipping the angular distribution on the opposite side of the beam 192. The optical element 212 is arranged in series with the optical element 196, wherein the exit beam 204 is the incoming beam with respect to the optical element 212.

A final exit beam 218 exhibits an angular distribution as shown by a graph 220.

The optical element 212 may be designed identical to the optical element 196, wherein the optical element 212 is rotated in the plane of the drawing by an angle of 90° with respect to the optical element 196.

Figure 11:
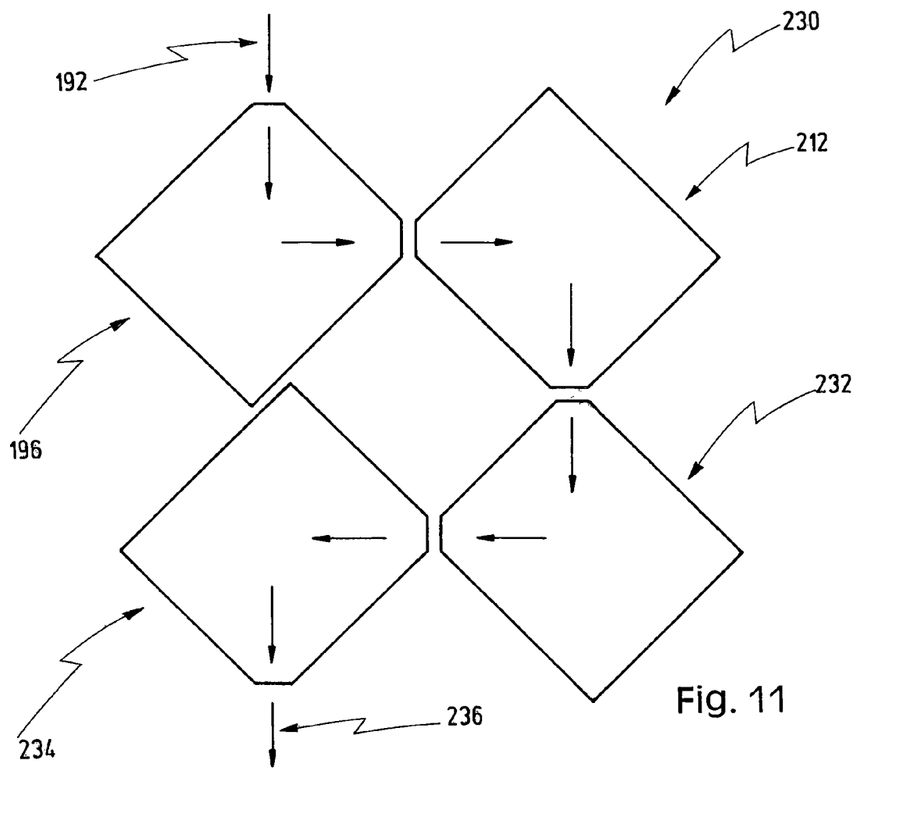
FIG. 11 shows another preferred embodiment of an optical system for shaping an incoming beam, wherein the system in FIG. 11 is a stacked arrangement of the optical system in FIG. 10.

FIG. 11 shows another embodiment of an optical system 230 which uses a plurality of the optical elements 196 and 214 of the optical system 190 in order to further enhance the gradient of the angular distribution of the exit beam compared with an incoming beam 192. The incoming beam 192 passes the optical elements 196, 212, 232, 234 and exits from the latter as exit beam 236.

According to FIG. 10, the beam 192 passes each of the optical elements 196 through 234 several times, thus further enhancing the gradient of the intensity distribution of the exit beam 236 by multiple TIR. Further, the optical system 230 allows the exit beam 236 to not only propagate in the same direction as the incoming beam 192, but also without directional offset.

Figure 12:
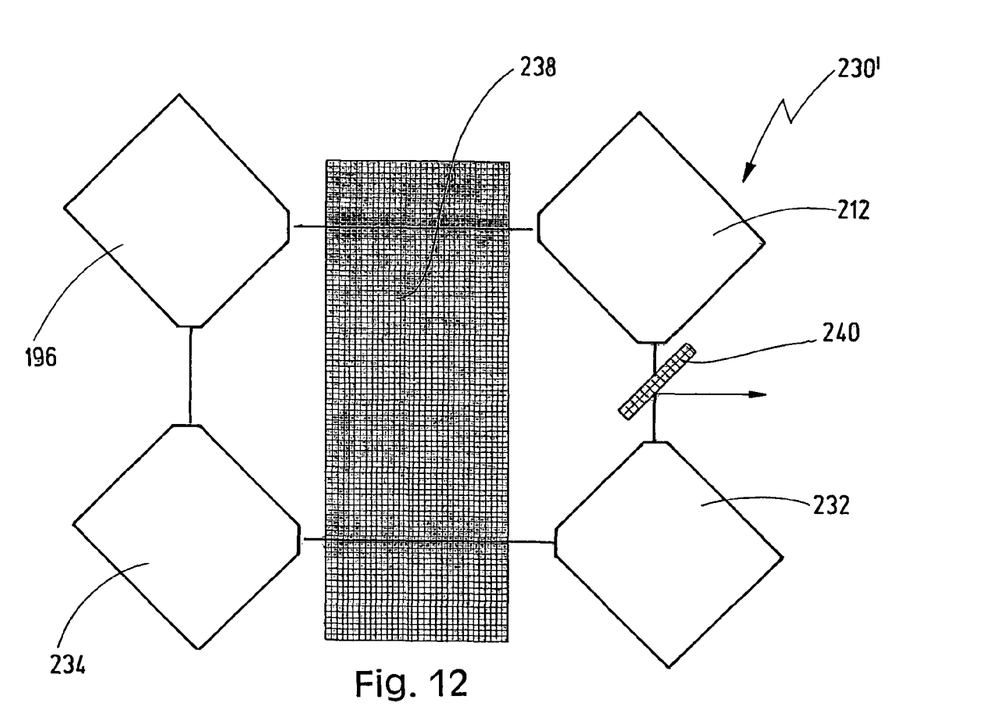
FIG. 12 shows a modification of the optical system in FIG. 11 used as a ring laser.

FIG. 12 shows an optical system 230' using the optical system 230 in FIG. 11 but having an active medium 238 arranged between the optical elements 196, 212, 232 and 234. In this way, the optical system 230' can be used as ring laser producing a laser beam having a reduced divergence in one direction. A partial reflector 240 can be used as an output coupler. Using a three-dimensional arrangement, a divergence in both orthogonal directions (x and y) can be reduced.

It is to be understood that each of the embodiments described above can be combined with one another into orthogonal planes for reducing a divergence of an incoming beam in both directions of the beam (x and y), in particular of an incoming beam having any rectangular profile.

As already mentioned, all embodiments described above can comprise HR coatings to enhance the gradient of the slopes of the angular distribution and AR coatings to reduce optical losses in the system Further, as already described with respect to FIG. 1 (detectors 55, 56, actuators 52, 54) each of the above-described embodiments can be equipped with an active stabilization technique for an automatic adjustment of the angular distribution of the TIR active optical elements like prisms or plates etc. as described above. For example, a part of the incoming beam transmitted at a TIR surface, can be received by a light sensitive device (detectors 55, 56 for example) like a photo diode, a one- or two-dimensional photo diode array or CCD-camera. The information from this device can be used as a feed-back signal for some active mechanical elements like piezo or step motors, for example the actuators 52 and 54 in FIG. 1 to adjust the slope of the angular distribution.

The optical systems described above are preferably used in annealing apparatuses or other material processing apparatus and techniques, e.g. for directional crystallization of amorphous silicon films, where the illumination line shaped according to the principles of the present invention is scanned over a substrate to be processed.

In the following, measures for the correction of dispersion and orthogonal divergence effects are described with respect to FIGS. 13 through 16.

If the beam to be formed is not monochromatic, dispersion in the bulk material of the optical elements (for example prisms 30 and 32 of the optical system 10 in FIG. 1) and in the coatings if provided have to be taken into account.

Figure 13:
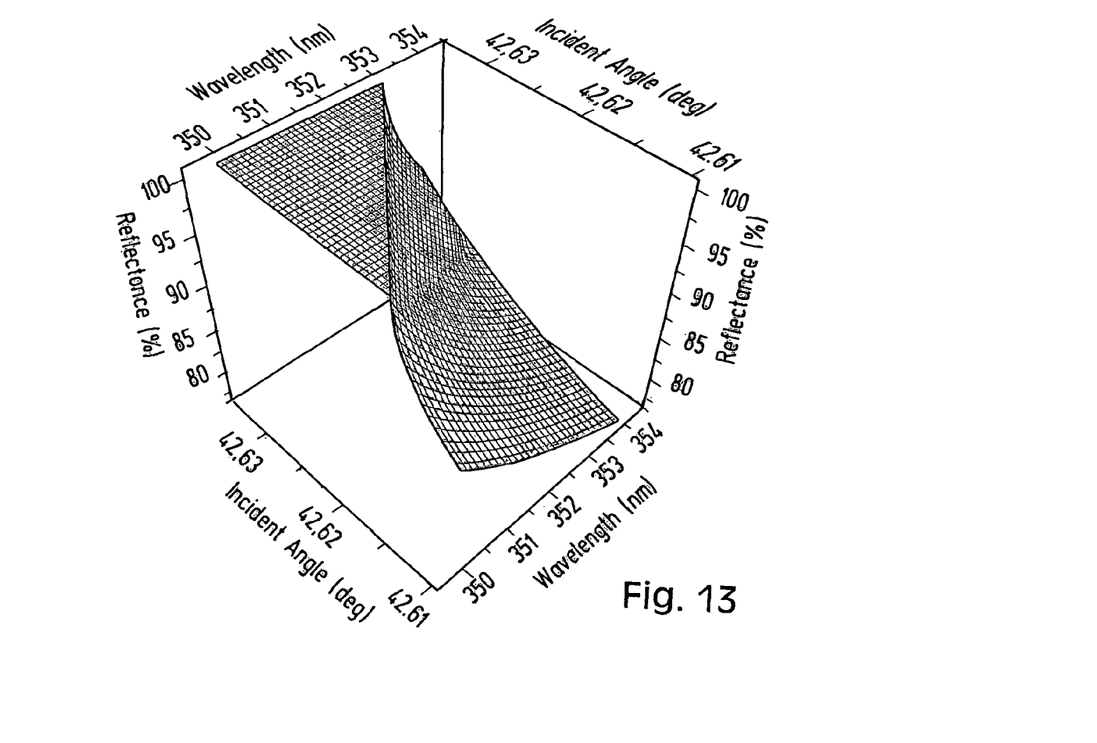
FIG. 13 shows a 3D-plot of the reflectance as a function of wavelength and incidence angle of a TIR interface.

FIG. 13 shows a typical dispersion of a coated TIR interface (for example TIR surface 34 in FIG. 1).

The angular dependency of reflectivity is essentially the same for different wavelengths, but the reflectivity curve is shifted to slightly different angles because of the dispersion of the optical material.

The critical angle $\alpha_{TIR}$ for total internal reflection is given by $$\sin \alpha_{TIR}(\lambda) = 1/n(\lambda)$$

wherein $n(\lambda)$ is the refractive index at the respective wavelength, and the critical angle (and the reflectivity curve) in general shifts to smaller angles at shorter wavelengths, as can be seen in FIG. 13.

If no correction means are present, this dispersion effect heavily limits the angular resolution of a divergence reduction element (for example prism 30 or 32 in FIG. 1) as described in the above embodiments for non-monochromatic radiation. However, correction is possible by using dispersing prisms before and after the beam passes through the actual divergence reduction elements, for example through the prism 30 and 32 or the rods or plates 98 in FIG. 5. The incidence angles on the correction prism (and on the entrance surface of the actual divergence reduction element) have to be chosen such that beams with different wavelengths travel along the same direction again after the last correction prism, but are incident on the TIR surface at the respective TIR angle for the respective wavelength.

There is a wide choice of combinations of incidence angles to achieve dispersion correction. However, it should be noted that the dispersive action of the refraction at the entrance surface of the divergence reduction element itself is never sufficient to achieve the above object. The reason is that dispersive effects are stronger for larger incidence angles, and for a single refraction at an angle which is smaller than the critical angle for TIR, the dispersive effect of a single refraction is not sufficient. Therefore, a dispersive element for the divergence reduction element is necessary. Likewise, the refraction at the exit surface of the divergence reduction element is not dispersive enough to compensate, and another dispersive element is required.

Figure 14:
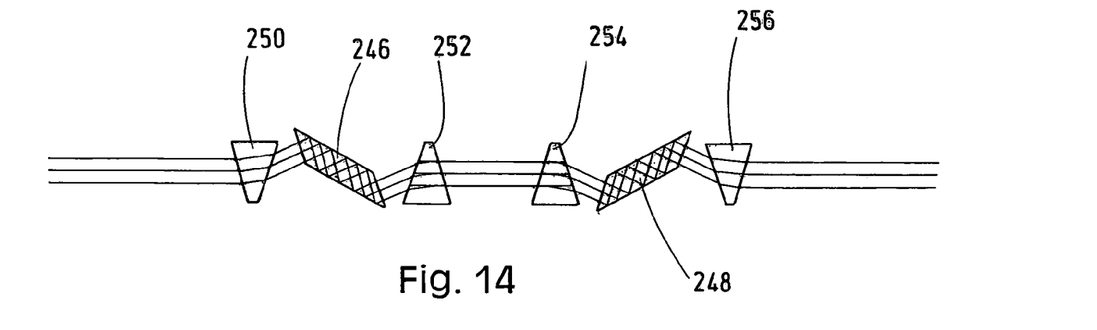
FIG. 14 shows an optical system for shaping an incoming beam wherein requirements for the correction of dispersion effects have been met.

For two elements 246, 248 reducing divergence on both sides of the angular spectrum, a total of four correction prisms 150, 152, 154, 156 can be used, as shown in FIG. 14.

For the correction of dispersion effects, dispersive elements other than prisms like reflection or transmission gratings, etc. can be used as well.

The correction of dispersion effects for polychromatic radiation has been described before. Such a correction is necessary because the critical angle for total internal reflection depends on the refractive index and thus on the wavelength of the radiation.

But even for strictly monochromatic radiation, the divergence reduction as set forth above only works well if the angular spectrum of the incoming beam is very narrow in the direction perpendicular to the plane of incidence. Otherwise, the inclination angle $\beta$ of the TIR interface surface and the pointing angle $\gamma$ in the orthogonal direction together determine the incidence angle $\alpha$ on the TIR interface surface, which is larger than the angle $\beta$ (see FIG. 15). The angles are related by $$\sin^2 \alpha = \sin^2 \gamma + \sin^2 \beta \cos^2 \gamma.$$

Figure 15:
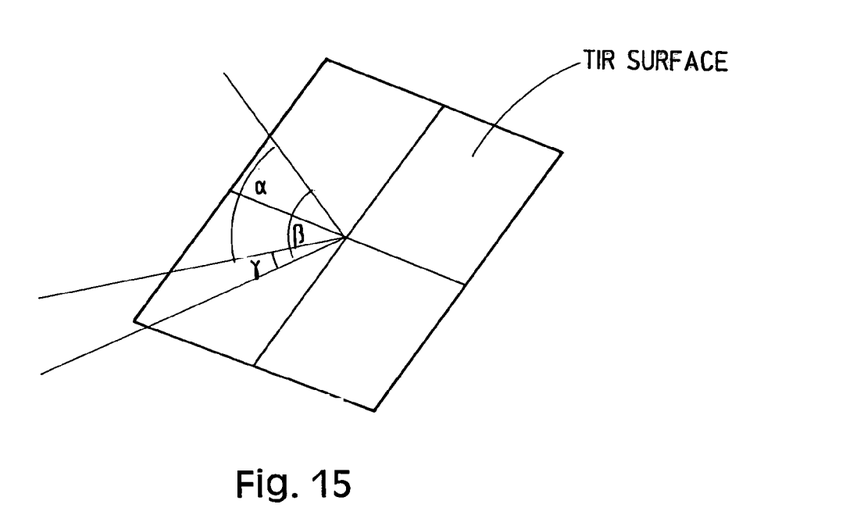
FIG. 15 is a scheme of a TIR interface exhibiting the effects of orthogonal divergence effects on beam shaping.

The afore-mentioned angles are illustrated in FIG. 15 where the rectangle illustrates the TIR surface.

Figure 16:
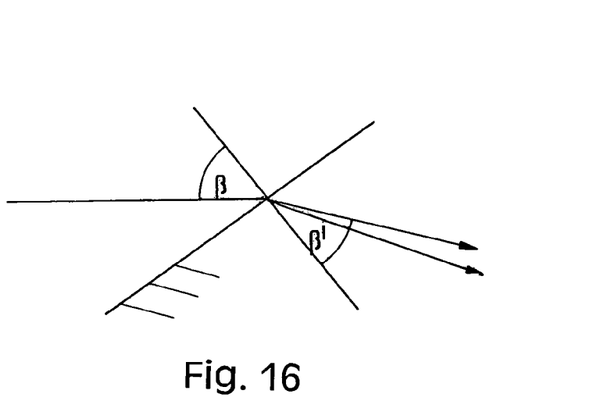
FIG. 16 shows another scheme for explaining the effects of orthogonal divergence on beam shaping.

This means that the incidence angle $\alpha$ depends on the orthogonal angle $\gamma$, and a different inclination angle $\beta$ would be required for each orthogonal angle to cover a certain orthogonal divergence range. The situation is similar to the effects of dispersion for polychromatic radiation, and, thus, the same correction mechanism as for dispersion effects can be used for the correction of orthogonal divergence effects. This can be seen with reference to FIG. 16 as follows:

Considering the refraction at a single surface using the nomenclature as above, seen in the projection in the plane of inclination $\beta$, the projected angle of refraction $\beta'$, in this projection, depends on the orthogonal incidence angle $\gamma$ and it can be shown that the law of refraction can be rewritten in a modified form (for projected angles and depending on the orthogonal angle $\gamma$):

$$\sin \beta'(\gamma) = \frac{\sin \beta}{n(\gamma)}$$

wherein the effective index $n(\gamma)$ depends on the orthogonal angle $\gamma$ as follows:

$$n(\gamma) = \frac{n}{\cos \gamma} \cdot \sqrt{1 - \frac{\sin^2 \gamma}{n^2}}$$

Using this modified law of refraction, beams for any orthogonal angles $\gamma$ can be traced in the projection as usual and the only difference is in the refractive index n, which now depends on the orthogonal incidence angle $\gamma$ and potentially also on the wavelength $\lambda$. In either case, compensation is possible as described above for correcting dispersion effects (see FIG. 14), and any refractive dispersion-corrected device will also be corrected for orthogonal divergence.

The invention claimed is:

1. An optical system configured to shape an incoming beam having a main direction of propagation and a divergence with an angular distribution at least in a first direction, said optical system comprising:
    at least one angle selective optical element configured to clip said angular distribution of said incoming beam in said at least first direction by at least one total internal reflection of said incoming beam,
    wherein said at least one angle selective optical element is configured to at least partially cut off rays of said incoming beam that propagate at a non-zero degree angle with respect to said main direction of propagation.

2. The optical system of claim 1, wherein said at least one angle selective optical element clips said angular distribution in said at least one first direction only.

3. The optical system of claim 1, wherein said at least one angle selective optical element clips said angular distribution in a second direction.

4. The optical system of claim 3, wherein said second direction is at least approximately perpendicular to said first direction.

5. The optical system of claim 1, wherein said at least one angle selective optical element clips said angular distribution in said first direction only, said optical system further comprising at least one second angle selective element for clipping said angular distribution in a second direction.

6. The optical system of claim 1, wherein said at least one angle selective optical element comprises at least one angle selectively reflecting element.

7. The optical system of claim 6, wherein said at least one angle selectively reflecting element has an increased optical density as compared to an environment of said at least one angle selectively reflecting element, and wherein said incoming beam hits at least one surface of said angle selectively reflecting element to said environment.

8. The optical system of claim 7, wherein said at least one angle selectively reflecting element is positioned with respect to said incoming beam such that said incoming beam hits said at least one surface at an angle which is approximately the critical angle of total internal reflection.

9. The optical system of claim 7, wherein said at least one surface is one of a plane, a sphere, a cylinder, an asphere, and a section thereof.

10. The optical system of claim 7, wherein said at least one surface is covered with a highly reflective coating.

11. The optical system of claim 6, wherein said at least one angle selectively reflecting element has an entrance surface, and wherein said at least one angle selectively reflecting element is positioned such that said entrance surface is at least approximately perpendicular to said incoming beam.

12. The optical system of claim 11, wherein said entrance surface is covered with an anti-reflective coating.

13. The optical system of claim 6, wherein said at least one angle selectively reflecting element has an exit face and wherein said at least one angle selectively reflecting element is positioned such that an exit beam emerging from said exit face is at least approximately perpendicular to said exit face.

14. The optical system of claim 13, wherein said exit face is covered with an anti-reflective coating.

15. The optical system of claim 6, wherein said at least one angle selectively reflecting element comprises at least one of a prism, a rod, a cuboid, a trapezoid, a body having a surface with a cross-section of at least one of a polygon, a trapezoid, a parallelogram.

16. The optical system of claim 1, wherein said optical system is capable of clipping said angular distribution in said first direction of said incoming beam having an expansion in a second direction exceeding an expansion of said incoming beam in said first direction by a factor of several hundreds.

17. The optical system of claim 16, wherein said expansion in said first direction is less than about 15 .mu.m.

18. The optical system of claim 17, wherein said expansion in said first direction is less than about 10 .mu.m.

19. The optical system of claim 18, wherein said expansion in said first direction is less than about 8 .mu.m.

20. The optical system of claim 16, wherein said expansion in said second direction is at least about 300 mm.

21. The optical system of claim 20, wherein said expansion in said second direction is at least 500 mm.

22. The optical system of claim 21, wherein said expansion in said second direction is at least 700 mm.

23. The optical system of claim 1, wherein said at least one angle selective element is a first angle selective element clipping said angular distribution on a first side of said angular distribution, and further comprising at least one second angle selective optical element clipping said angular distribution on a second side opposite to said first side.

24. The optical system of claim 1, wherein a relative position of said incoming beam and said at least one angle selective element is adjustable.

25. The optical system of claim 1, further comprising at least three angle selective optical elements.

26. An optical system for producing a thin laser beam for material processing, comprising an optical system of claim 1.

27. The optical system of claim 26, used for a directional crystallization of amorphous silicon films.

28. A device for correcting of dispersion and divergence of an incoming beam, using an optical system of claim 1.

29. A device for correcting divergence in orthogonal directions of a laser beam having a rectangular profile, using an optical system of claim 1.

30. A device for reducing divergence in a solid state ring laser, using an optical system of claim 1.

31. A beam shaping optical unit for shaping an intensity profile of an incident beam and forming an intensity profile of an exit beam, wherein said incident beam has at least at one side a first intensity gradient due to a divergence of said incident beam at least in a first dimension, said beam shaping optical unit shaping said exit beam such that said exit beam has a second intensity gradient at the at least one side, wherein said second gradient is larger than said first gradient, said beam shaping optical unit forming said intensity profile of said exit beam by at least one total internal reflection.

32. The beam shaping optical unit according to claim 31, further comprising a beam splitter.

33. The beam shaping optical unit according to claim 32, with said beam splitter acting as an output coupler in a solid state ring laser.

34. The beam shaping optical unit of claim 31, wherein said beam shaping optical unit acts on an angular distribution of said incident beam.

35. The beam shaping optical unit of claim 31, wherein said incident beam has an extension in said first dimension defining a width and an extension in a second dimension transverse to said first dimension and defining a length, and wherein said exit beam has an extension in a first dimension defining a width and an extension in a second dimension transverse to said first dimension and defining a length, wherein said width of said exit beam deviates at least by 20% of said width of said incident beam, wherein said width of said beams is defined by a full width at half maximum intensity.

36. The beam shaping optical unit of claim 35, comprising at least one optical element formed by a rod-like body of length L with a cross-section formed by at least one of a polygon, a prism, a square-like cross-section, and a trapezoid shape.

37. The beam shaping optical unit of claim 36, wherein said at least one optical element is adjustable by at least one actuator with respect to an axis perpendicular to said incident beam.

38. The beam shaping optical unit of claim 32, wherein said beam splitter splits said incident beam into said exit beam and an additional beam.

39. The beam shaping optical unit according to claim 38, wherein said additional beam is absorbed by an additional beam dump.

40. The beam shaping optical element of claim 39, wherein said beam dump is a water cooled beam dump.

41. The beam shaping optical unit of claim 31, wherein said beam shaping optical unit forms said intensity profile of said exit beam by a sequence of total internal reflections.

42. The beam shaping optical unit of claim 31, further comprising at least one wave length sensitive optical element for correcting a dispersion induced angular spread of said incident beam.

43. The beam shaping optical unit of claim 42, wherein said wave length sensitive optical element also corrects an angular spread in said exit beam which is due to an angular spread of said incident beam in a dimension perpendicular to said first dimension.

44. A method, comprising:
shaping an incoming beam having a main propagation direction and a divergence with an angular distribution in a first direction by clipping said angular distribution in said first direction by at least one total internal reflection of said incoming beam and by at least partially cutting off rays of said incoming beam that propagate at a non-zero degree angle with respect to said main direction of propagation.

45. The method of claim 44, further comprising correcting effects of dispersion on said total internal reflection.

46. The method of claim 44, further comprising correcting effects of orthogonal divergence of said incoming beam on said total internal reflection in a direction orthogonal to said first direction.

47. The method of claim 46, further comprising correcting of divergence of said incoming beam in said first direction and a second direction orthogonal to said first direction, for a laser beam having a rectangular profile.

48. The method of claim 46, used for reducing divergence in a solid state ring laser.

* * * * *

UNITED STATES PATENT AND TRADEMARK OFFICE
CERTIFICATE OF CORRECTION

PATENT NO. : 7,944,615 B2
APPLICATION NO. : 12/097937
DATED : May 17, 2011
INVENTOR(S) : Vitaliy Shklover It is certified that error appears in the above-identified patent and that said Letters Patent is hereby corrected as shown below:

Column 6,
Line 58, Delete "bees" and insert --been--

Column 10,
Line 21, Delete "system" and insert --system.--

Column 12,
Line 1, After " $n(\gamma) = \dfrac{n}{\cos\gamma} \cdot \sqrt{1 - \dfrac{\sin^2\gamma}{n^2}}$ "

Insert --.--

Signed and Sealed this
Nineteenth Day of July, 2011

David J. Kappos
*Director of the United States Patent and Trademark Office*